United States Patent [19]
Uchiyama et al.

[11] 3,928,306
[45] Dec. 23, 1975

[54] PEPTIDES HAVING XENOPSIN-LIKE PHARMACOLOGICAL ACTIVITY

[75] Inventors: Mikio Uchiyama, Urawa; Shinro Tachibana, Narashino; Kengo Araki, Niiza; Takafumi Nakamura, Tokyo, all of Japan

[73] Assignee: Eisai Co., Ltd., Tokyo, Japan

[22] Filed: Oct. 22, 1974

[21] Appl. No.: 517,107

[30] Foreign Application Priority Data
Oct. 23, 1973  Japan.............................. 48-118550
Oct. 23, 1973  Japan.............................. 48-118551

[52] U.S. Cl............................ 260/112.5 R; 424/177
[51] Int. Cl.$^2$................. C07C 103/52; A61K 37/00
[58] Field of Search................................. 260/112.5

[56] References Cited
OTHER PUBLICATIONS
Erspamer, Ann. Rev. Pharm., 11, 337–347 (1971).

Sander et al., Ann. Rev. Pharm., 12, 250–255 (1972).

*Primary Examiner*—Lewis Gotts
*Assistant Examiner*—Reginald J. Suyat
*Attorney, Agent, or Firm*—Wenderoth, Lind & Ponack

[57]  ABSTRACT

New penta- and octapeptides are provided represented by the formula:

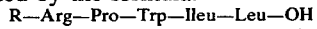

wherein R stands for hydrogen atom or the grouping of pyrGlu—Lys—Ileu—Leu—OH. Said peptides possess various pharmacological activities such as contracting activity on muscle of stomach fundus, depression of blood pressure and the like, and may be used in therapeutic treatments as substitute of the known octapeptide hereinafter-named "Xenopsin" obtained from natural source.

3 Claims, No Drawings

PEPTIDES HAVING XENOPSIN-LIKE PHARMACOLOGICAL ACTIVITY

This invention relates to new pentapeptide and octapeptide represented by the general formula:

R—Arg—Pro—Trp—Ileu—Leu—OH  (I)

wherein R is H or the grouping, pyrGlu—Lys—Gly.

It has been found that the peptides of the formula (I) possess various pharmacological activities especially activities of contraction on muscle of stomach fundus (fundus ventriculi muscle), blood pressure depression and the like.

The present inventors formerly succeeded in isolation of a new peptide compound by extraction from skin of African frog (Xenopus laevis pipidae) and confirmed that said peptide compound possesses pharmacological activities such as contraction on muscle of stomach fundus, depression of blood pressure and the like, and a patent application (Japanese Patent application No. 82,103/72), was filed therefor.

On successive study of chemical structure, it has been confirmed that said new peptide is an octapeptide consisting of a series of the amino acids represented by the following formula:

pyrGlu—Gly—Lys—Arg—Pro—Tr-
p—Ileu—Leu—OH  (II)

and the compound was named "Xenopsin".

In further study of the present inventors with respect to the pharmacological activities represented by said octapeptide, it has been confirmed that the pharmacological activities of Xenopsin rely upon the presence of the pentapeptide moiety represented by the formula:

—Arg—Pro—Trp—Ileu—Leu—OH which constitutes the essential part of the molecule of said octapeptide. It is therefore recognizable that the peptide compounds of the present invention, which are shown by the aforementioned formula (I), that is:

R—Arg—Pro—Trp—Ileu—Leu—OH  (I)

wherein R is H or the grouping of pyrGlu—Lys—Gly, because of their chemical structures, should naturally have the Xenopsin-like pharmacological activities. Actually, it has been confirmed that said compound of the formula (I) wherein R is hydrogen atom, and is thus the pentapeptide represented by the formula:

H—Arg—Pro—Trp—Ileu—Leu—OH  (III)

which belongs to one of the peptides claimed in the present invention possesses the pharmacological activities almost equivalent to 1/200 of those presented by the natural octapeptide of the formula (II), that is, Xenopsin.

In obtaining Xenopsin, there is, however, a decisive difficulty in that not only there is a limitation in commercial viewpoint to avail African frog as natural source, but also it requires the complicated extraction steps for isolation of the intended compound from said natural source. In synthetic method of said compound, on the other hand, there is a defect of complication in the steps of successive conjunctions of the eight(8) amino acid units different from one another.

Contrary to the abovementioned synthetic method, the synthesis of the pentapeptide compound of the formula (III) according to the present invention can be effected more easily than the synthesis of Xenopsin. Since said pentapeptide is obtained by the steps of successive conjunctions of only five(5) different amino acid units, it may be said that said excellent pharmacological activities represented by Xenopsin, that is, the minimum quantity required for representation of effective pharmacological activity is only $10^{-9}$–$10^{-10}$ g/ml will be compensated by substitution with the new compound of the present invention, although the latter compound possesses lower pharmacological activities, if the simplicity of the total steps required for synthesizing the new pentapeptide compound is taken into consideretion.

In case where R is the abovementioned formula (I) is the grouping of pyrGlu—Lys—Glu, said compound is an octapeptide having the formula:

pryGlu—Lys—Gly—Arg--Pro—Tr-
p—Ileu—Leu—OH  (IV)

which, as is evident from the formula, is the compound different from the octapeptide compound of the abovementioned formula (II), i.e., Xenopsin, in that the conjunctions of the second and third aminoacid groupings are in reverse order. It has also been found that the octapeptide compound of the formula (IV) shows the pharmacological activities such as contraction effect on muscle of stomach fundus, depression of blood pressure and the like equivalent to those of Xenopsin. The new octapeptide of the invention may thus be employed in leu of Xenopsin.

The pentapeptide of the formula (III) of the present invention may be prepared by splitting off by means of chemical treatment of the protective radical or radicals contained in the protected pentapeptide of the formula:

$R_1$—(N$^\omega$—$R_2$)Arg—Pro—Trp—Ileu—Leu—O$R_3$  (V)

wherein $R_1$, $R_2$ and $R_3$ are hydrogen atoms or one or more protective groupings capable of being split off by means of chmical treatment with the proviso that there is no case where all of $R_1$, $R_2$ and $R_3$ are simultaneously hydrogen atoms.

Octapeptide compound of the abovementioned formula (IV), which belongs to the claimed peptides of the present invention, on the other hand, may be prepared by splitting off of the protective radical or radicals in the protected octapeptide of the formula:

$R_4$—pyrGlu-(N$^\epsilon$—$R_5$)Lys—Gly—(N$^\omega$—$R_6$)Ar-
g—Pro—Trp—Ileu—Leu—O$R_7$  (VI)

In the abovementioned formula (VI), $R_4$, $R_5$, $R_6$ and $R_7$ are hydrogen atoms or one or more of them are the protective radical(s) which is/are capable of being split off by chemical treatment that does not affect the octapeptide chain, i.e., pyrGlu—Lys—Gly—Arg—Pro—Tr-
p—Ileu—Leu—OH of said octapeptide, with the proviso that there is no case where all of the radicals $R_4$, $R_5$, $R_6$ and $R_7$ are simultaneously the hydrogen atoms.

There are several types of said amino protective radicals $R_1$, $R_2$ and $R_3$ in the formula (V); and $R_4$, $R_5$, $R_6$ and $R_7$ in the octapeptide of the formula (VI), such as acyl-type radicals includding formyl, benzoyl, phtharyl, trifluoroacetyl and tosyl radicals; alkyl-type radicals including trityl, benzyl and the like; alkyliden radicals; and urethane-type radicals such as benzyloxycarbonyl, p-bromo-, p-chloro- and p-methoxy-benzyloxycarbonyl, tolyloxycyclohexyoxy- and t-butoxycarbonyl radicals. As for the protective radical on the carbonyl, that is, $R_3$ in the formula (V); or $R_7$ in the formula (VI), there may be mentioned lower alkyl, such as methyl, ethyl, propyl and the like; benzyl, p-bromo-, p-chloro-, p-methoxy-benzyls and the like.

The splitting off of abovementioned protective radical or radicals from the protected penta- and octapeptides of the formulae (V) and (VI) by the chemical treatment according to the present invention can be effected by means of the customary methods such as treatment with trifluoroacetic acid, hydrofluoric acid and the like, as well as a catalytic reduction in the presence of palladium-carbon or the like.

In an embodiment, benzyloxy carbonyl and nitro groups, for example, may be split off by catalytic reduction in the presence of palladium carried on carbon as the catalyst in a solvent such as methanol, ethanol, dioxan, dimethyl formamide or the like; or by utilization of the hydrogen fluoride method disclosed in Bulletin of the Japanese Chemical Society 40, 2164 (1967); while t-butoxy-carbonyl as the protective radical may be split off by the treatment with trifluoroacetic acid. The resulting compound of the formula (I), if desired, may be converted into its pharmacologically acceptable acid-addition salts in accordance with a conventional salt-forming method. As pharmacologically acceptable inorganic acid, there may be mentioned hydrochloric, sulfuric, hydrobromic and nitric acids, for example; and as for the pharmacologically acceptable organic acid, there may be mentioned formic, oxalic, acetic, citric, tartaric, fumaric, maleic and methane-sulfonic acids and the like.

The protected pentapeptide and octapeptide of the formulae (V) and (VI), which serve as the starting materials for carrying out the process of the present invention are new substances. Several methods may be utilized for the syntheses of the new protected peptides of the formulae (V) and (VI), depending upon the characteristics of the structural formulae of the purposed peptides. In one exemplification, said peptide may be obtained by condensation of the following two fragmental components A and B:

H—Trp—Ileu—Leu—OR$_3$
(Fragment A), and

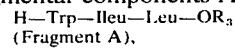
(Fragment B), wherein R$_1$, R$_2$ and R$_3$ have the meanings same as those aforementioned.

These fragments A and B may together be condensed to form the compound of the formula (V) according to the methods usually employed for peptide-conjunction, such as Merifield method, azide method, mixed acid anhydrides method, carbodiimide method and activated ester method, and W. König and R. Geiger's method (a modification of the aforementioned carbodiimide method in the presence of N-hydroxyimide compound).

Solvent for the condensation reaction may suitably be employed such as amide series compounds including dimethyl formamide, dimethyl acetamide and the like; halogenated alkyl series solvent such as dichloromethane, chloroform, and carbon tetrachloride; ether series solvents such as ethyl ether; tetrahydrofuran and dioxane, alone or in an admixture thereof.

The fragment A is also a new compound which may be prepared by successive bondings of the respective amino acid units. For example, the fragment of the formula:

H—Trp—Ileu—Leu—OBZL (B')

may be prepared in accordance with the following FIG. I:

Figure I

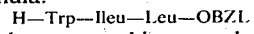

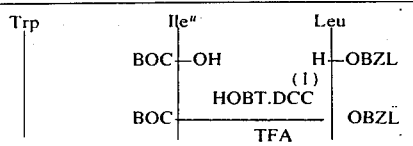

Figure I—Continued

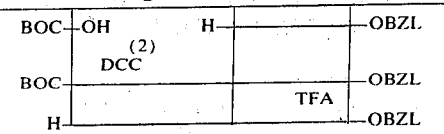

In the above formula B' and FIG. I, the abbreviations have the following meanings:

(1): W. König and R. Geiger's method
(2): Carbodiimide method
BOC: t-Butoxycarbonyl radical
BZL: Benzyl radical
DCC: Dicyclohexylcarbodiimide
HOBT: N-Hydroxybenzotriazole
TFA: Trifluoro-acetic acid Protected octapeptide of the formula (IV) may also be synthetically prepared by means of several methods depending upon the characteristics of the chemical structure of the contemplated compound. There may be mentioned a condensation of the following two fragments, for example:

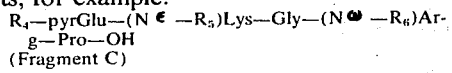
(Fragment C)

and

H—Trp—Ileu—Leu—OR$_7$
(Fragment D), wherein R$_4$, R$_5$, R$_6$ and R$_7$ have the meanings same as those aforementioned.

The condensation of the Fragments C and D to form the compound of the formula (VI), like the synthesis of the protected pentapeptide as aforementioned, may be effected in accordance with the known methods usually employed for the peptide conjunction such as Merifield method, azide method, mixed acid anhydride method, carbodiimide method, activated ester method and W. König and R. Geiger's method (a modification of the abovementioned carbodiimide method in the presence of N-hydroxyimide compound).

Solvent for the condensation reaction may suitably be employed such as amide series solvents including dimethyl formamide, dimethyl acetamide and so on; halogenated alkyl series solvents such as dichloromethane, chloroform and carbon tetrachloride; ether series solvents such as ethyl ether; tetrahydrofuran and dioxane, alone or in an admixture thereof.

The abovementioned fragments C and D are also new compounds and may be prepared by successive bondings of the respective amino acid units. For example, one of the Fragment A having the following formula:

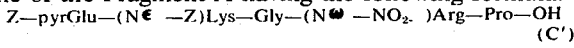

may be prepared in accordance with the following FIG. II.

Figure II

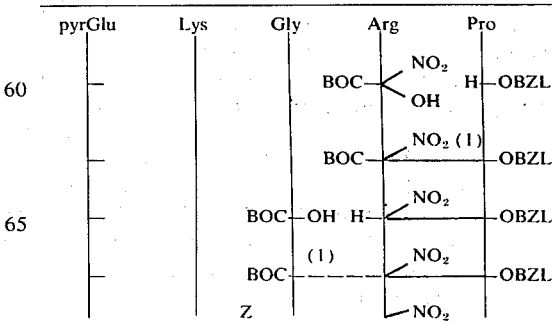

Figure II-continued

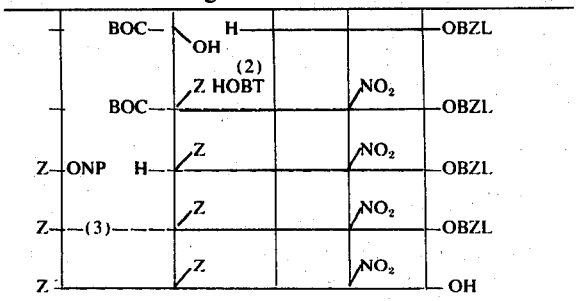

Further, one of the fragment D, the protected tripeptide having the following formula, for example, H—Trp—Ile—Leu—OBZL  (D')

may be prepared in accordance with the following FIG. III:

Figure III

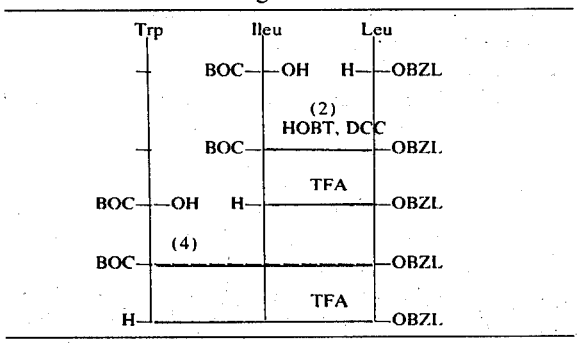

In the abovementioned formulae (C') and (D'), and FIGS. II and III, the abbreviations have the following meanings:

(1): Mixed acid anhydrides method;
(2): W. König and R. Geiger's method;
(3): Activated ester method; and
(4): Carbodiimide method;
Z: Benzyloxycarbonyl
ONP: p-Nitrophenyl ester
BOC: t-Butoxycarbonyl
OBZL: Benzyl ester
TFA: Trifluoro acetic acid
HOBT: N-Hydroxybenzotriazole
DCO: Dicyclohexylcarbodiimide It has been found that the pentapeptide of the formula (III) obtained in accordance with the present invention, as the result of animal tests, possesses the pharmacological activities equivalent to 1/200 of those of Xenopsin.

The octapeptide compounds of the formula (IV) obtained by the process of the present invention, on the other hand, show in animal test the following pharmacological effects:

1. Test for contraction on muscle of stomach fundus of rat (Magnus method):
   Threshold dose: 0.1 ng/ml
   Dose response: observed
2. Test on rat for blood pressure depressing effect:
   Threshold dose (intravenous injection): 1.2 g/ml.

From the data, it is apparent that the peptide compounds of the present invention are useful as blood pressure depressant or the like in therapeutic treatments.

The following examples will serve to illustrate the invention.

EXAMPLE 1

Synthesis of H—Arg—Pro—Trp—Ileu—Leu—OH 1.1 Grams of BOC—($N^\omega$—$NO_2$)Arg—Pro—Trp—Ileu—Leu—OBZL are dissolved in 50 ml of 98% formic acid. The resulting solution is stirred at room temperature for 4 hours, which is then concentrated under reduced pressure.

To the concentrate, there is added 50 ml of ethylether and precipitate separates out is recovered by filtration.

The precipitate is dissolved in 80 ml of a 10% acetic acid in methanol, which is then subjected to catalytic reduction in the presence of 10% palladium on carbon for 2 days. After completion of the reduction, the spent catalyst is removed by filtration. The filtrate is concentrated under reduced pressure. To the concentrate are added ethylether and the precipitate separates out is recovered by filtration and washed with ethyl ether.

There are obtained 0.8 grams of the purposed crude product. The crude product is purified chromatographically with a column charged with SP-Sephadex (a commercial product sold by Pharmacia Company) passing through 0.05 M ammonium formate buffer solution at pH 6.5 as eluting liquor. The main flow-out liquor fraction recovered is subjected to freeze-drying to obtain the purposed product in a form of formate having the following characteristics.

$[\alpha]_D^{29} = -65.6°$ (c=0.32 in water).
Analytical data of aminoacid units:
Arg=0.96, Pro=101, Ileu=1.00, Leu=0.97
Elementary analysis for $C_{34}H_{53}N_9O_6 \cdot 2HCOOH \cdot 2H_2O$ gives:

|  |  | C | H | N |
|---|---|---|---|---|
| Calculated | (%): | 53.24 | 7.58 | 15.52 |
| Found | (%): | 53.14 | 7.23 | 15.83 |

Thin layer silica gel chromatography

Rf=0.36 (in developing medium of n-butanol : acetic acid : water in 4 : 1 : 5)
Rf=0.66 (in developing medium of n-butanol : acetic acid : pyridine : water = 30 : 20 : 6 : 24)

BOC—($N^\omega$—$NO_2$)Arg—Pro—Tr- p—Ileu—Leu—OBZL, the starting material employed, is obtained as follows:
575 mg of H—Trp—Ileu—Leu—OBZL hydrochloride are dissolved in 10 ml of tetrahydrofuran. To the resulting solution, there are added 1.1 ml of a 10% N-methylmorpholine tetrahydrofuran solution, followed under stirring with cooling at 0°C. by the successive additions of 416 mg of BOC—($N^\omega$—$NO_2$)Arg—Pro—OH, 250 mg of N-hydroxybenzotiazol and 250 mg of dicyclohexylcarbodiimide. The whole is stirred at the temperature same as the above for 5 hours and settled for overnight at room temperature. The precipitate separated out is removed by filtration, and the filtrate is concentrated under reduced pressure. The resulting concentrate is dissolved in 100 ml of ethyl acetate, and the solution is successively washed with an aqueous normal solution of sodium bicarbonate, water, M/4 citric acid, water, again an aqueous normal solution of sodium bicarbonate and water, dried on anhydrous sodium sulfate.

The dry concentrate is concentrated under reduced pressure. 0.9 G. of the residue is purified by reprecipitation from a mixture of ethyl acetate and petroleum ether to obtain the intended product in a powdery form melting at 95°–115°C. with decomposition under froth
[α]$_D^{29}$ = –69.0° (c=1 in MeOH)

Elementary analysis for $C_{46}H_{66}N_{10}O_{10}·½H_2O$ gives:

|  |  | C | H | N |
|---|---|---|---|---|
| Calculated | (%): | 59.52 | 7.29 | 15.09 |
| Found | (%): | 59.67 | 7.26 | 14.78 |

In thin layer silicalgel chromatography:
Rf=0.36 (in developing medium of ethylacetate), and
Rf=0.92 (in developing medium of n-butanol : acetic acid : water = 4 : 1 : 5)

H—Trp—Ile—Leu—OBZL used as starting material in Example 1 is also a new compound which may be obtained as follows:

REFERENTIAL EXAMPLE 1

Synthesis of H—Trp—Ileu—Leu—OBZL a. BOC—Trp—Ileu—Leu—OBZL, synthesis of; 3.9 g of BOC—Ileu—Leu—OBZL are dissolved in a 50% trifluoroacetic acid/dichloromethane solution. The resulting solution is allowed to stand for 1.5 hours at room temperature, concentrated under reduced pressure; and the residue is added to 200 ml of hydrogen-chloride-containing ethylether. White precipitate separated out is recovered by filtration and dried. 3 Grams of the dry precipitate having the melting point of 154°–155°C. are dissolved in 30 ml of tetrahydrofuran, and 0.88 ml of N-methylmorpholine are further added thereto. Under cooling to 0°C., there are added successively 2.4 grams of BOC—Trp—OH, 1.3 grams of N-hydroxybenzotriazol and 1.8 grams of cyclohexylcarbodiimide. After stirring at that temperature, for 1 hour, further stirring is continued, for 4 hours and allowed to stand for overnight. The precipitate crystallized out is removed by filtration, and the filtrate, after washing with ethylacetate, is concentrated under reduced pressure. The solution obtained by dissolving the residue in ethyl ester is washed successively with water, an aqueous normal solution of sodium bicarbonate, again water, M/4 citric acid aqueous solution and still again water; and dried on Glauber's salt. The residue obtained by concentration under reduced pressure is recrystallized from a mixture of ethyl ether and n-hexane. There are thus obtained 4.5 grams of the purposed product in a white powdery substance having the melting point of 154°–156°C.

[α]$_D^{24}$ = –42° (c=1 in methanol)

Value of mass-spectrum: n/e 620 (M$^+$)

Elementary Analysis for $C_{35}H_{48}N_4O_6$ gives:

|  |  | C | H | N |
|---|---|---|---|---|
| Calculated | (%): | 67.70 | 7.81 | 9.03 |
| Found | (%): | 67.73 | 8.06 | 9.34 |

In thin layer silica gel chromatography:
Rf=0.86 (in ethyl ether as developer)

b. REFERENTIAL EXAMPLE (b)

Synthesis of H—Trp—Ileu—Leu—OBZL 2.5 Grams of BOC—Trp—Ileu—Leu—OBZL are dissolved in 20 ml of a 50% trifluoroacetic acid/dichloromethane solution containing 0.4 ml of mercaptoethanol and 0.5 ml of anisol. The resulting solution is stirred at room temperature for 30 minutes, and it is concentrated under reduced pressure to 5 ml. To the concentrate are successively added 100 ml of ethyl ether and 4 ml of a 10%-hydrogen chloride/ethylacetate solution.

A gelatinous precipitate is recovered by filtration to obtain the purposed product in a form of hydrogen chloride addition salt which is recrystallized from a mixture of ethanol/isopropyl ether. Yield : 1.9 grams, and the melting point of 219°–220°C.

[α]$_D^{27}$ = –25.33 (c=0.75 in 50% methanol)

Elementary analysis for $C_{30}H_{40}N_4O_4·HCl·H_2O$ gives:

|  |  | C | H | N |
|---|---|---|---|---|
| Calculated | (%): | 62.63 | 7.55 | 9.74 |
| Found | (%): | 62.62 | 7.26 | 9.84 |

On thin layer silica gel chromatography:
Rf=0.83 (in n-butanol : acetic acid : water = 4 : 1 : 5 as developer), and
Rf=0.87 (in n-butanol : acetic acid : pyridine : water = 30 : 6 : 20 : 24 as developer)

EXAMPLE 2

Synthesis of Pyr Glu—Lys—Gly—Arg—Pro—Trp—Ileu—Leu—OH 140 mg of A-Pyr Glu—(N$^ε$—Z)Lys—Gly—(N$^ω$—NO$_2$)Arg—Pro—Trp—Ileu—OBZL are dissolved in 25 ml of methanol which contains 0.05 ml of acetic acid. The solution is subjected to catalytic reduction in the presence of a 10% palladium carried on carbon for 9 days continuously. After the treatment, the spent catalyst is filtered off. The filtrate is concentrated under reduced pressure. The resulting residue is purified on a column packed with SP-Sephadex (a commercial product sold by Pharmacia Company) passing through ammonium formate buffer solution at pH 6.5 as eluting liquor. The collected main flow-out liquid fractions is subjected to freeze-drying to obtain the purposed product in a white powder.

[α]$_D^{30}$ = –41.7° (c=0.43 in a mixture of methanol and dimethyl formamide in a ratio of 1 : 0.1)

Elementary analysis for $C_{47}H_{73}N_{13}O_{10}$ gives:

|  |  | C | H | N |
|---|---|---|---|---|
| Calculated | (%): | 53.43 | 6.06 | 15.58 |
| Found | (%): | 53.57 | 5.90 | 15.40 |

Thin layer silica gel chromatography gives:
Rf=0.47 (in developing medium consisting of n-butanol : acetic acid : water = 4 : 1 : 5), and
Rf=0.76 (in developing medium consisting of n-butanol : acetic acid : pyridine : water = 30 : 20 : 6 : 24).

The starting material,
Z-Pyr—Glu—(N$^ε$—Z)Lys—Gly—(N$^ω$—NO$_2$)—Arg—Pro—Trp—Ileu—Leu—OBZL
employed in the above experiment is obtained as follows:

690 mg of H—Trp—Ileu—Leu—OBZL·HCl are dissolved in 20 ml of dimethyl formamide. To the solution, there are added 0.168 ml of triethylamine and then 1.0 g of

and the whole is stirred under cooling to 10°C. To the solution, 200 mg of hydroxybenzotriazol and 258 mg of dicyclohexylcarbodiimide are added, and the reaction is conducted at the temperature of 10°C. for 5 hours, followed by stirring at room temperature for overnight. The reaction mixture is further allowed to stand at room temperature for one day. Precipitate crystallized out is removed by filtration and the filtrate is concentrated under reduced pressure. 80 ml of ethyl ether are added to the concentrate and oily substance is recovered by decantation, which is then dissolved in 3 ml of tetrahydrofuran. 100 ml of ethyl acetate is added to the solution, and the precipitate separated out is recovered by filtration. 1.1 Grams of the crude product are thus obtained. The crude product is recrystallized twice from a mixture of dimethyl formamide/ethylacetate to obtain the intended product in a pure form having the following characteristics:

$[\alpha]_D^{30} = -37°$ ($c=1$ in methanol)

Elementary analysis for $C_{32}H_{49}N_9O_{11}$ gives:

|  |  | C | H | N |
|---|---|---|---|---|
| Calculated | (%): | 52.22 | 6.73 | 17.13 |
| Found | (%): | 52.11 | 6.86 | 16.25 |

Thin layer silica gel chromatography gives:

Rf=0.64 (in developing medium of n-butanol : acetic acid : water = 4 : 1 : 5), and Rf=0.76 (in n-butanol : acetic acid ; pyridine : water = 30 : 20 : 6 : 24)

a. Fragments of Z—Pyr—Glu—(N$^\epsilon$ —Z)Lys—Gly—(N$^\omega$ —NO$_2$)Arg—Pro—OH and b. H—Trp—Ileu—Leu—OBZL may be synthesized by the following referential procedures.

REFERENCE 1

Synthesis of
Z—Pyr—Glu—(N$^\epsilon$ —Z)Lys—Gly—(N$^\omega$ —NO$_2$)Arg—Pro—OH a. Preparation of BOC—(N$^\omega$ —NO$_2$)Arg—Pro—OBZL 4.7 Grams of BOC—(N$^\omega$ —NO$_2$)Arg—Pro—OH are dissolved in 30 ml of dimethylformamide. To the resulting solution under cooling at −5°–0°C., there are further added drop by drop under stirring 1.65 ml of N-methylmorpholine and 2.1 grs. of isobutyl chloroformate. Continuing the stirring the solution further 10 minutes, 4.35 grs. of H—Pro—OBZL.HCl, 1.98 ml of N-methylmorpholine, both dissolved in 20 ml of dichloromethane are added dropwise under stirring. After stirring further 1.5 hours at −5°–0°C. the reaction mixture is allowed to stand for 12 hours at room temperature, and concentrated under reduced pressure. Resulting residue is dissolved in 150 ml of ethylacetate. The solution is washed successively with water, M/4 citric acid in water, again water, aqueous normal solution of sodium bicarbonate and still again water; dried on magnesium sulfate, and concentrated under reduced pressure. The residue is subjected to chromatography through column packed with Wako-Gel C-100 (a commercial product of Wako Pure Chemicals Company) using ethylacetate as eluating solvent. The collected eluates are subjected to thin layer silica gel chromatography with ethyl acetate as developer. Portion of a single spot at at Rf=0.41 is collected and recovered the purposed product from a tetrahydrofuran/ethyl ether system. Yield of the product is 5.0 grams. The product melts at about 50°C. with froth decomposition.

$[\alpha]_D^{26} = -61°$ ($c=1$ in methanol)

Elementary analysis of the product for $C_{25}H_{34}N_6O_7 \cdot \frac{1}{2}C_4H_8O$ gives:

|  |  | C | H | N |
|---|---|---|---|---|
| Calculated | (%): | 55.32 | 7.09 | 15.49 |
| Found | (%): | 55.55 | 7.08 | 15.60 |

Thin layer silica gel chromatography gives:
Rf=0.41 (in ethylacetate as developer).

b. Preparation of BOC—Gly—(N$^\omega$ —NO$_2$)Arg—Pro—OBZL 3.2 Grams of BOC—(N$^\omega$ —NO$_2$)Arg—Pro—OBZL are dissolved in a 50% trifluoro acetic acid/dichloromethane solution, stirred at room temperature for 40 minutes and concentrated under reduced pressure to about 5 ml.

To the concentrate there are added 50 ml of ethyl ether, and the precipitate separates out is recovered by filtration, washed with ethyl ether and dried. 3.2 Grams of the dry substance are thus obtained.

Apart from the above, 1.08 grs. of BOC—Gly—OH are dissolved in 10 ml of tetrahydrofuran. To the resulting solution are added under cooling 0.68 ml of N-methylmorpholin and 0.84 grs. of isobutylchloroformate at −5°–0°C. After 15 minutes, there is added dropwise a solution prepared by dissolving the dry substance prepared in the preceding paragraph in a mixture of 0.68 ml of N-methylmorpholin and 15 ml of dichloromethane. The whole is stirred at the temperature same as that abovementioned for 2 hours and at room temperature overnight. After concentration under reduced pressure, the reaction product is dissolved in 200 ml of ethylacetate, washed successively with M/4 citric acid, water, n-aqueous solution of sodium bicarbonate and again water, dried on Glauber's salt and concentrated under reduced pressure to obtain oily substance. The substance is subjected to column chromatography through Wako gel C-100 as carrier and ethyl acetate as eluating liquor and then thin layer silica gel chromatography in ethyl acetate as developing liquor to collect 3.0 grs. of the single spot portion at Rf=0.14 and from which the purposed substance is recovered as an oily product.

c. Preparation of BOC—(N$^\epsilon$—Z)Lys—Gly—(N$^\omega$—NO$_2$)Arg—Pro—OBZL

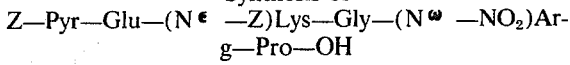

are dissolved in a mixture of 20 ml of a 50% trifluoro-acetic acid/dichloromethane and 1 ml of anisol, stirred at room temperature for 40 minutes and the resulting solution is concentrated under reduced pressure. To the residue thus obtained, there is added 100 ml of ethyl ether containing 3 ml of a 10% hydrogen chloride/isopropyl ether. Precipitate separated out is recovered by filtration, washed with ethyl ether, dried to obtain 2.4 grs. of a dry substance consisting of H—Gly—(N$^\omega$ —NO$_2$)Arg—Pro—OBZL in a form of hydrogen chloride addition salt.

2.35 Grs. of said addition salt and 2.7 grs. of BOC—(N$^\epsilon$ —Z)Lys—OH.dicyclohexylamine salt are suspended in 50 ml of tetrahydrofuran and well shaken. Under cooling, there are added 0.94 g of N-hydroxybenzotriazol and 1.67 g of dicyclohexyl urea. The whole is stirred at that temperature for three hours and then at room temperature overnight.

Precipitate separated out is removed by filtration and the filtrate is concentrated under reduced pressure. The residue is dissolved in 150 ml of ethyl acetate and the solution is washed successively with water, n-aqueous solution of sodium bicarbonate, again water, M/4 citric acid, still again water and n-aqueous solution of sodium bicarbonate and further water; dried on Glauber's salt, and concentrated under reduced pressure. The residue is reprecipitated from a mixture of ethyl acetate and ethyl ether. 2.7 Grs. of the precipitate are recovered which are recrystallized from a mixed solvent consisting of ethyl ether and peterolium ether. M. P. of the crystal is 57°–63°C. with froth decomposition.

$[\alpha]_D^{30} = -50°$ ($c=0.62$ in methanol)

Elementary analysis of the product for $C_{39}H_{55}N_9O_{11}$ gives:

|  |  | C | H | N |
|---|---|---|---|---|
| Calculated | (%): | 56.70 | 6.72 | 15.26 |
| Found | (%): | 56.64 | 6.82 | 14.89 |

Thin layer silica gel chromatography gives:
Rf=0.89 (in n-butanol : acetic acid : water in the ratio of 4 : 1 : 5 as developer); and
Rf=0.31 (in ethylacetate : ethanol in the ratio of 9 : 1 as developer).

d. Preparation of BOC—(N$^\epsilon$—Z)Lys—Gly—(N$^\omega$—NO$_2$)Arg—Pro—OH 2.5 Grs. of BOC—(N$^\epsilon$—Z)Lys—Gly—(N$^\omega$—NO$_2$)Arg—Pro—OBZL are dissolved in a mixture of 9 ml of methanol and 3 ml of n-aqueous solution of caustic soda, and the solution is stirred at room temperature for 5 hours. To the reaction liquor, there are added 2.5 ml of n-hydrochloric acid and the solution is concentrated under reduced pressure. The residue is extracted with ethylacetate, and the extract, after washed with water and dried on Glauber's salt, is concentrated under reduced pressure. To the residue, there is added ethyl ether and the precipitate separated out is recovered by filtration, which is then dissolved in 15 ml of n-aqueous solution of sodium bicarbonate, washed with ethylacetate, acidified with M/4 citric acid and extracted with ethyl acetate. The extract is washed with water, dried on Glauber's salt and concentrated under reduced water. To the residue, there is added ethyl ether and the purposed product is recovered therefrom in a solid form. Yield 1.2 g; melting point is 92°–95°C (under froth decomposition)

$[\alpha]_D^{30} = -37°$ ($c=1$ in methanol)

Elementary analysis for $C_{32}H_{49}N_9O_{11}$ gives:

|  |  | C | H | N |
|---|---|---|---|---|
| Calculated | (%): | 52.22 | 6.73 | 17.13 |
| Found | (%): | 52.11 | 6.86 | 16.25 |

Thin layer silica gel chromatography gives:
Rf=0.64 (in n-butanol : acetic acid : water in the ratio of 4 : 1 : 5 as developer); and
Rf=0.76 (in n-butanol : acetic acid : pyridine : water in the ratio of 30 : 20 : 6 : 24 as developer)

e. Preparation of Z—Pyr—Glu—(N$^\epsilon$—Z)Lys—Gly—(N$^\omega$—NO$_2$)—Arg—Pro—OH 1 Gr. of BOC—(N$^\epsilon$—Z)Lys—Gly—(N$^\omega$—NO$_2$)Arg—Pro—OH is dissolved in a mixture consisting of 0.2 ml of anisol and 15 ml of a 50% trifluoro-acetic acid/dichloromethane, and the solution, after stirred at room temperature for one hour, is concentrated under pressure. To the concentrate, there is added 45 ml of ethyl ether and the precipitate separated out is recovered by filtration, washed with ethyl ether and dried to obtain 1 gr. of the dry substance, that is, trifluoroacetate of H—(N$^\epsilon$—Z)Lys—Gly—(N$^\omega$—NO$_2$)Arg—Pro—OH.

The dry substance is dissolved in 9 ml of dimethyl formamide, and to the solution there is added 0.92 ml of N-methylmorpholine and 0.58 g of Z—Pyr—Glu—ONP. The precipitate separated out is recovered by filtration. The precipitate is reprecipitated from a mixed solvent of ethanol and ethyl acetate, which is then reprecipitated twice from a mixed solvent of ethanol and water. There are obtained 0.9 g. of the powdery substance. Melting point of the product is 130°–150°C. with decomposition.

$[\alpha]_D^{30} = -41.7°$ ($c=1$ in methanol : dimethylformamide in the ratio of 1 : 0.1)

Elementary analysis for $C_{40}H_{52}N_{10}O_{15} \cdot H_2O$ gives:

|  |  | C | H | N |
|---|---|---|---|---|
| Calculated | (%): | 53.43 | 6.06 | 15.58 |
| Found | (%): | 53.57 | 5.90 | 15.40 |

Thin layer silica gel chromatography gives:
Rf=0.47 (in n-butanol : acetic acid : water in the ratio of 4 : 1 : 5 as developer); and
Rf=0.76 (in n-butanol : acetic acid : pyridine : water in the ratio of 30 : 20 : 6 : 24 as developer)

REFERENTIAL EXAMPLE 2 a. Preparation of BOC—Trp—Ileu—Leu—OBZL 3.9 Grs. of BOC—Ileu—Leu—OBZL are dissolved in a 50% trifluoro-acetic acid/dichloromethane solution, and the resulting solution, after allowed to stand at room temperature for 1.5 hours, is concentrated under reduced pressure. The residue is introduced into 200 ml of ethyl ether which contains hydrogen chloride. White precipitate separated out is recovered by filtration and dried. The precipitate having the melting point of 154°–155°C., which amounts to 3.0 grs., are dissolved in 30 ml of tetrahydrofuran, and 0.88 ml of N-methylmorpholine are then added thereinto. To the mixture, there are added 2.4 grs. of BOC—Trp—OH under cooling to 0°C. and then 1.3 grs. of N-hydroxybenzotriazol and 1.8 grs. of dicyclohexylcarboimide. The mixture after stirring at that temperature for one hour, additional stirring at room temperature is continued for 4 hours and then allowed to stand overnight. Precipitate separated out is removed by filtration and the filtrate after washing with ethylacetate is concentrated under reduced pressure. The residue is dissolved in ethylacetate, washed successively with water, n-aqueous solution of sodium bicarbonate, again water, M/4 citric acid in water and still again water and dried on Glauber's saft. The residue obtained by concentration under reduced pressure is recrystallized from a mixture of ethyl ether and n-hexane. There is thus obtained the contemplated product in a form of white powder. Yield: 4.5 grs., melting point: 154°–156°C.

$[\alpha]_D^{24} = -4.2°$ ($c=1$ in methanol) and mass spectrum: m/e 620 (M⁺)
Elementary analysis for $C_{35}H_{48}N_4O_6$ gives:

|  |  | C | H | N |
|---|---|---|---|---|
| Calculated | (%): | 67.70 | 7.81 | 9.03 |
| Found | (%): | 67.73 | 8.06 | 9.34 |

Thin layer silica gel chromatography gives:
Rf=0.86 (in ethyl ether as developer)

b. Preparation of H—Trp—Ileu—Leu—OBZL 2.5 Grs. of BOC—Trp—Ileu—Leu—OBZL are dissolved in 20 ml of a 50% trifluoroacetic acid/dichloromethane mixture, which contains 0.4 ml of mercapto ethanol and 0.5 ml of anisol. The solution, after stirring at room temperature for 30 minutes, is concentrated under reduced pressure to 5 ml. To the concentrate, there are first added 100 ml of ethyl ether and then 4 ml of a 10%-hydrogen chloride/ethyl acetate solution. Gelatinous precipitate thus separated out, which is the hydrochloride of the purposed product, is recovered by filtration and recrystallized from a mixture of ethanol/isopropyl ether. Yield: 1.9 grs.; melting point: 219°–220°C.

$[\alpha]_D^{27}=-25.33°$ (c=0.75 in 50% ethanol)
Elementary analysis of the product, $C_{30}H_{40}N_4O_4 \cdot HCl \cdot H_2O$ gives:

|  |  | C | H | N |
|---|---|---|---|---|
| Calculated | (%): | 62.63 | 7.55 | 9.74 |
| Found | (%): | 62.62 | 7.26 | 9.84 |

Thin layer silica gel chromatography gives:
Rf=0.83 (in the developing solvent of n-butanol : acetic acid : water = 4 : 1 : 5); and
Rf=0.87 (in the developing solvent of n-butanol : acetic acid : pyridine : water = 30 : 6 : 20 : 34)

What is claimed is:

1. Peptide compounds represented by the general formula:

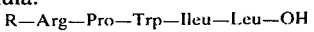

wherein R stands for H or the grouping of pyr-Glu—Lys—Gly.

2. Pentapeptide compound claimed in claim 1 wherein R is H.

3. Octapeptide compound claimed in claim 1 wherein R is the grouping of pyrGlu—Lys—Gly.

* * * * *